United States Patent [19]

Douthit et al.

[11] Patent Number: 4,522,547

[45] Date of Patent: Jun. 11, 1985

[54] HEAVY LOAD CONVEYOR SYSTEM

[75] Inventors: C. Staton Douthit; Edward R. Kirby, both of Dallas, Tex.

[73] Assignee: Associated Truss Company, Dallas, Tex.

[21] Appl. No.: 496,844

[22] Filed: May 23, 1983

[51] Int. Cl.³ .............................................. B65G 67/02
[52] U.S. Cl. ................................... 414/391; 414/399; 414/529; 248/421
[58] Field of Search ............... 414/391, 392, 399, 529, 414/917, 745; 248/421; 193/35 SS

[56] References Cited

U.S. PATENT DOCUMENTS

| | | | |
|---|---|---|---|
| 218,272 | 8/1879 | Hutton | 248/421 |
| 1,017,749 | 2/1912 | Gunther | 414/399 |
| 1,757,772 | 5/1930 | Johnson | 414/917 X |
| 2,720,989 | 10/1955 | Wormser | 414/530 |
| 3,083,808 | 4/1963 | Graybeal | 198/478 |
| 3,360,141 | 12/1967 | Martin | 414/391 X |
| 3,392,852 | 7/1968 | Tegner | 414/45 |
| 3,792,784 | 2/1974 | Mosterd | 414/45 |
| 3,952,883 | 4/1976 | Phillips | 414/917 |
| 4,020,959 | 5/1977 | Livesay | 414/530 X |
| 4,057,150 | 11/1977 | Lunden | 414/917 X |
| 4,175,899 | 11/1979 | Tipton | 414/917 X |
| 4,411,586 | 10/1983 | Zitser et al. | 414/917 X |

FOREIGN PATENT DOCUMENTS

| | | | |
|---|---|---|---|
| 1756629 | 4/1970 | Fed. Rep. of Germany | 414/391 |
| 683036 | 2/1930 | France | 414/399 |

Primary Examiner—Joseph E. Valenza
Assistant Examiner—Stuart J. Millman
Attorney, Agent, or Firm—Kanz, Scherback & Timmons

[57] ABSTRACT

A heavy load conveyor system (10) according to the present invention includes substantially horizontal support member (14) having a working surface (12), a plurality of substantially vertical legs (18 and 20), a base (22 and 24) and a plurality of links (26 and 28) pivotally connected at one end to the legs and at the other end to the base. A removable link brace includes a fixed member (38) and a removable member (40) having a lever member (42) and a link engaging member (46). A carriage (50) is supported by wheels (58) on tracks (54 and 56) which are substantially parallel to the plane of motion of the links and includes a plurality of rollers (60) which are substantially parallel to the tracks.

8 Claims, 3 Drawing Figures

HEAVY LOAD CONVEYOR SYSTEM

DESCRIPTION

TECHNICAL FIELD

The present invention relates generally to conveyors and in one of its aspects to a method and apparatus for transferring heavy loads from a work station to a carriage or conveyor.

BACKGROUND ART

Material feeding systems are well known which employ parallel links pivotally connected to a horizontal support member at the top and a base at the bottom to form a parallelogram arrangement which can be rocked by some hydraulic arrangement or electromechanical means. Such an arrangement for an automatic material feeding apparatus is shown in U.S. Pat. No. 3,952,883 issued to Phillips. A specialized parallelogram arrangement with an arm extending from the horizontal top edge of the parallelogram is shown in U.S. Pat. No. 1,757,772 issued to Johnson, and a stacking and palletizing system is shown using such an apparatus in U.S. Pat. No. 3,392,852 issued to Tegner.

The parallelogram linkage systems for material feeding and stacking are primarily adapted for fully automated operations and have the hydraulic or electomechanical apparatus to control the swing of the linkage parallelogram so that the linkage does not fully collapse. Such systems are not well adapted for semi-automated use or use where only human force is available.

DISCLOSURE OF INVENTION

A heavy load conveyor system according to the present invention includes a substantially horizontal support member having a working surface for supporting a heavy load. This working surface might be used for supporting the load while it is being processed such as at a work station on an assembly line. The conveyor system also includes a plurality of substantially vertical legs supporting the support member, a base, and a plurality of links corresponding to the plurality of legs, each link being pivotally connected at one end to the leg near the bottom of the leg and pivotally connected at the opposite end to the base. The links are of substantially the same length between pivot points and are pivoted in the same direction so that the support member can be moved horizontally and vertically by rocking the links. The systems also includes a removable link brace for supporting at least one link in a substantially vertical position when the link brace is in place. When the link brace is removed so that it no longer supports the link, then human force applied in a horizontal direction in the direction of pivot can push the support member to the down position.

In one arrangement, the link brace for the present invention includes a fixed member which prevents rocking the link in one direction from the substantially vertical position and a removable member which prevents rocking the link in the opposite direction from the substantially vertical position when the removable member is in place.

A preferred arrangement of a heavy load conveyor system according to the present invention also includes a carriage having a carriage surface for accepting a heavy load transferred from the support member. The carriage surface is lower than the working surface of the support member when the plurality of links are in a substantially vertical up position and is higher than the working surface when the plurality of links are not in a substantially vertical up position. In one arrangement, the system includes a plurality of substantially horizontal tracks which are substantially parallel to the plane of motion of the links. The carriage further comprises a plurality of wheels for moving the carriage on the tracks. In a preferred arrangement, the carriage further includes a plurality of rollers rotatably mounted on the carriage which are substantially parallel to the tracks for transferring a heavy load in a direction which is transverse to the tracks. The tops of the rollers form the carriage surface in such a case, and the rollers can be used for transferring the heavy load from one carriage to another carriage which is aligned with the first.

In a preferred arrangement, the removable member of the link brace includes a lever member which is pivotally connected to the fixed member and an engaging member rigidly connected to one end of the lever member. The engaging member engages the link when in a first position and does not engage the link when in a second position. The end of the lever member opposite the engaging member extends beyond the pivot point sufficiently far for a user to kick that end of the lever member to disengage the engaging member from the link.

These and other objects, advantages and features of the invention will be more fully explained, reference being had to the accompanying drawings.

DETAILED DESCRIPTION OF THE PREFERRED EMBODIMENT

Figure 1:
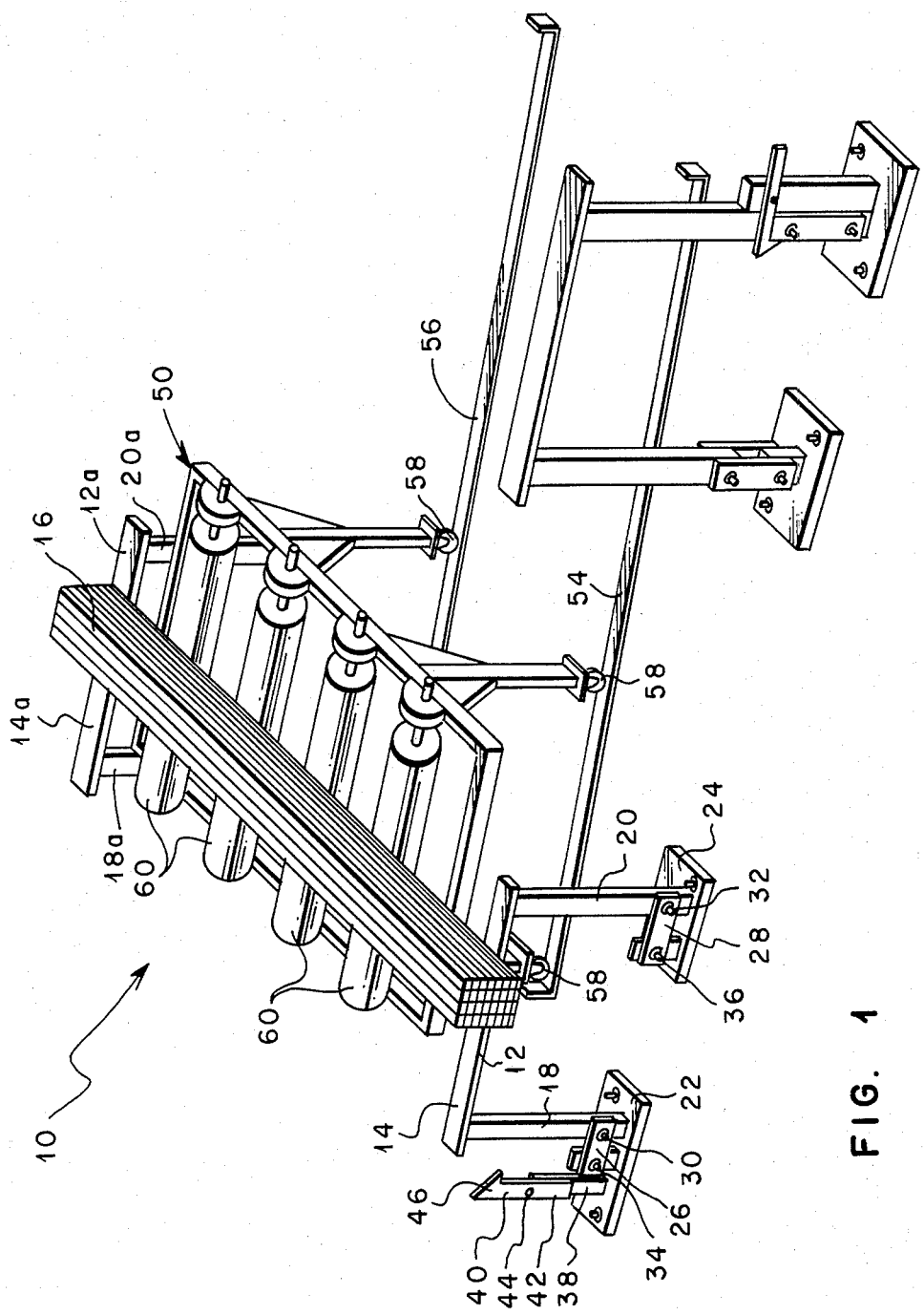
FIG. 1 is a perspective view of a heavy load conveyor system according to the present invention.

Referring now to the drawings and in particular to FIG. 1, a heavy load conveyor system according to the present invention is referred to generally by reference numeral 10. Conveyor system 10 includes substantially horizontal support means comprising substantially horizontal support members 12 and 12a having a working surface 14 and 14a for supporting a heavy load such as a stack of lumber 16. Conveyor system 10 further includes a plurality of substantially vertical legs 18, 18a, 20 and 20a supporting the support means, and base means comprising base members 22, 24 and 22a and 24a which are not shown but which form part of the system which in all respects will be the same as the one here described. A plurality of links 26 and 28 corresponding to the plurality of legs 18 and 20 are pivotally connected at one end 30 and 32 respectively to legs 18 and 20 respectively near the bottom of the legs and pivotally connected at the opposite end 34 and 36 respectively to the base means. Links 26 and 28 are of substantially the same length between pivot points and are pivoted in the same direction so that the support means made up of support member 12 and on the opposite end by support member 12a can be moved horizontally and vertically by rocking the links.

Heavy load conveyor system 10 also includes a removable link brace comprising a fixed member 38 which prevents rocking link 26 in one direction from a substantially vertical position and a removable member 40 which prevents rocking the link in the opposite direction from the substantially vertical position when the removable link member is in place. The removable link brace thus supports at least one link, in this case link 26, in a substantially vertical position when the link brace is in place.

Figure 2:
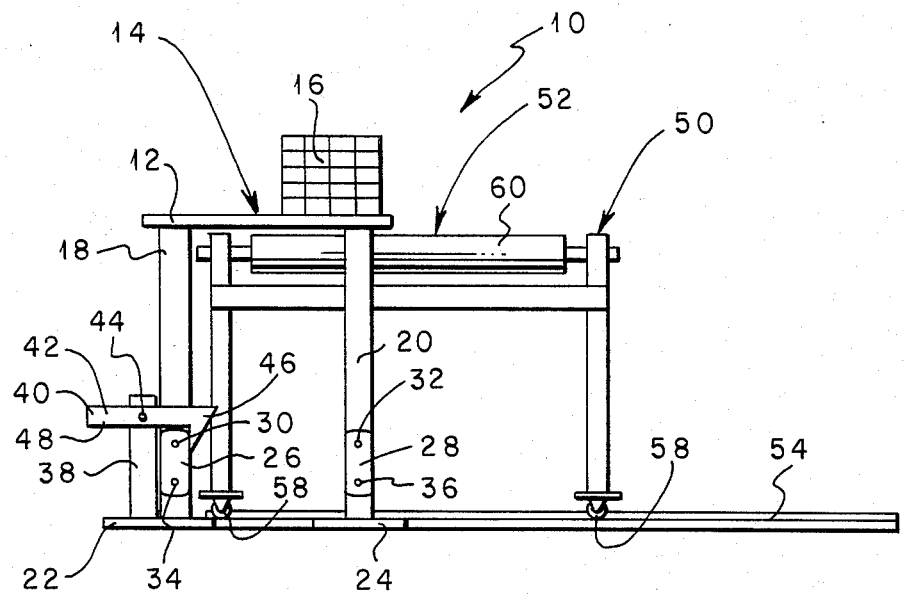
FIG. 2 is elevational view of a heavy load conveyor system according to the present invention with the links in the substantially vertical up position.
Figure 3:
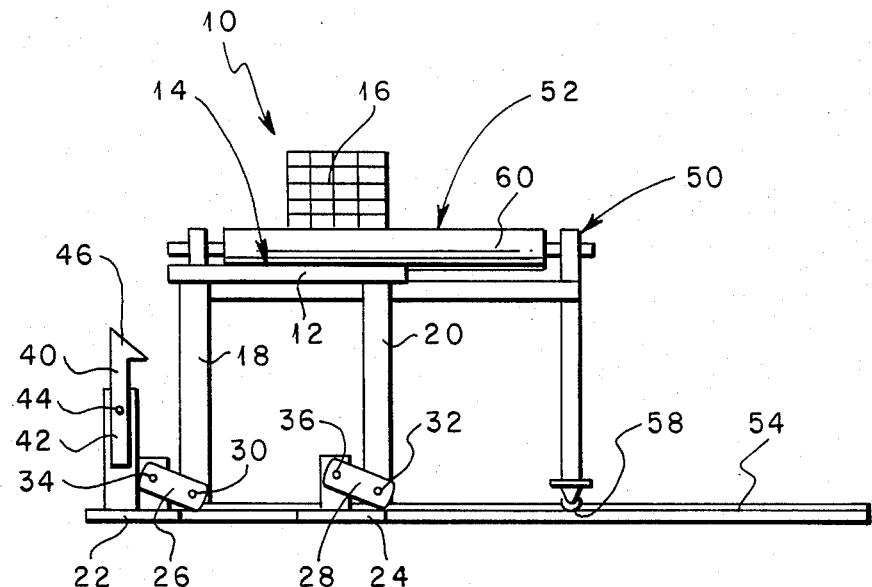
FIG. 3 is an elevational view of the system of FIG. 1 in the down position.

Referring now also to FIG. 2 and FIG. 3, where like parts have like numbers as the elements in FIG. 1, removable member 40 comprises a lever member 42 which is pivotally connected at 44 to fixed member 38 and an engaging member 46 which engages link 26 when in a first position as shown in FIG. 2 and does not engage the link when in a second position as shown in FIG. 3. The end 48 of lever member 42 opposite engaging member 46 extends beyond pivot point 44 sufficiently far for a user to kick that end, end 48, of the lever member to disengage the engaging member from the link.

A preferred arrangement of conveyor system 10 also includes a carriage 50 having a carriage surface 52 for accepting a heavy load such as stack of lumber 16 transferred from support member 12. Carriage surface 52 is lower than working surface 14 when the plurality of links 26 and 28 are in a substantially vertical up position as shown in FIG. 2 and is higher than working surface 14 when the plurality of links are not in a substantially vertical up position as shown in FIG. 3. A plurality of substantially horizontal tracks 54 and 56 are substantially parallel to the plane of motion of the links and in this case are substantially horizontal. Carriage 50 includes a plurality of wheels 58 rollingly supporting the rest of the carriage on the tracks. In a preferred form, carriage 50 also includes a plurality of rollers 60 rotatably mounted on the carriage. Rollers 60 are substantially parallel to the tracks and can be used for transferring load 16 in a direction which is transverse to the tracks. In such an arrangement, the tops of rollers 60 form carriage surface 52. In such an arrangement, a number of similar systems can be arranged together to align in a direction transverse to tracks 54 and 56 so that load 16 can be transferred from one carriage to the next by simply aligning the carriages on the tracks and pushing the load to roll from the set of rollers on one carriage to the rollers on the next carriage. In this way, a number of work stations can be aligned. This is especially useful in such operations as sorting lumber at a work station which would consist of two support means in the up position for supporting the load. All of the lumber meeting a certain standard could then be stacked together as in lumber stack 16 and when completed, the worker can simply kick lever member 42 to release link engaging member 46. A slight nudge then knocks support member 12 into the down position, transferring the stack of lumber onto carriage 50. Carriage 50 can then be rolled along tracks 54 and 56 to align with the next carriage. Once aligned, the stack of lumber can then be transferred to the next carriage or as far down as necessary for the next operation.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

We claim:

1. A heavy load conveyor system comprising in combination:

substantially horizontal support means having a working surface for supporting a heavy load;

a plurality of substantially vertical legs supporting the support means;

base means;

a plurality of links corresponding to the plurality of legs, each link being pivotally connected at one end to a leg near the bottom of the leg and pivotally connected at the opposite end to the base means, wherein the links are of substantially the same length between pivot points and are pivoted in the same direction whereby the support means can be moved horizontally and vertically by rocking the links; and a removable link brace including two support surfaces for providing abutting support to two predetermined surfaces of at least one link in a substantially vertical position when said removable link brace is in an abutting support position, at least one of said two support surfaces being disengagable from said at least one link to allow said at least one link to be rocked from said substantially vertical positon.

2. A heavy load conveyor system according to claim 1 wherein the removable link brace comprises in combination:

a fixed member operatively positioned to provide an abutting support to said at least one link when said at least one link is in a substantially vertical position, said fixed member prevents rocking the link in one direction toward said fixed member from the substantially vertical position; and a removable member operatively positioned to provide an abutting support to said at least one link to prevent rocking the link in the opposite direction from the substantially vertical position when the removable member is in an abutting support position, said removable member being disengagable from said abutting support position with said at least one link to allow said at least one link to rock in said opposite direction.

3. A heavy load conveyor system according to claim 2 further comprising a carriage having a carriage surface for accepting a heavy load transferred from the support means wherein the carriage surface is lower than the working surface of the support member when the plurality of links are in a substantially vertical up position and is higher than the working surface when the plurality of links are not in a substantially vertical up position.

4. A heavy load conveyor system according to claim 3 further comprising a plurality of substantially horizontal tracks which are substantially parallel to the plane of motion of the links wherein the carriage further comprises a plurality of wheels rollingly supporting the rest of the carriage on the tracks.

5. A heavy load conveyor system according to claim 4 wherein the carriage further comprises a plurality of rollers rotatably mounted on the carriage which are substantially parallel to the tracks for transferring the heavy load in a direction which is transverse to the tracks wherein the tops of the rollers form the carriage surface.

6. A heavy load conveyor system according to claim 5 wherein the removable member comprises a lever member which is pivotally connected to the fixed member and an engaging member rigidly connected to one end of the lever member which engages the link when in a first position and does not engage the link when in a second position wherein the end of the lever member opposite the engaging member extends beyond the pivot point sufficiently far for a user to kick that end of the lever member to disengage the engaging member from the link.

7. A heavy load conveyor system according to claim 3 wherein the carriage further comprises a plurality of rollers rotatably mounted on the carriage which are substantially parallel to the tracks for transferring the heavy load in a direction which is transverse to the tracks wherein the tops of the rollers form the carriage surface.

8. A heavy load conveyor system according to claim 2 wherein the removable member comprises a lever member which is pivotally connected to the fixed member and an engaging member rigidly connected to one end of the lever member which engages the link when in a first position and does not engage the link when in a second position wherein the end of the lever member opposite the engaging member extends beyond the pivot point sufficiently far for a user to kick that end of the lever member to disengage the engaging member from the link.

* * * * *